United States Patent
Dmitriev et al.

(10) Patent No.: US 11,646,555 B2
(45) Date of Patent: May 9, 2023

(54) CABLE LINE WITH ELECTRICALLY CONDUCTIVE AREAS

(71) Applicant: OBSHCHESTVO S OGRANICHENNOJ OTVETSTVENNOSTYU "ENERGOTEK", Saint-Petersburg (RU)

(72) Inventors: Mikhail Viktorovich Dmitriev, Saint-Petersburg (RU); Dmitry Vladimirovich Kuleshov, Saint-Petersburg (RU); Alexandr Evgenievich Shabanov, Saint-Petersburg (RU)

(73) Assignee: OBSHCHESTVO S OGRANICHENNOJ OTVETSTVENNOSTYU "ENERGOTEK", Saint-Petersburg (RU)

( * ) Notice: Subject to any disclaimer, the term of this patent is extended or adjusted under 35 U.S.C. 154(b) by 0 days.

(21) Appl. No.: 17/285,643

(22) PCT Filed: Sep. 20, 2019

(86) PCT No.: PCT/RU2019/000654
§ 371 (c)(1),
(2) Date: Apr. 15, 2021

(87) PCT Pub. No.: WO2020/080974
PCT Pub. Date: Apr. 23, 2020

(65) Prior Publication Data
US 2021/0391698 A1    Dec. 16, 2021

(30) Foreign Application Priority Data
Oct. 16, 2018    (RU) ............................ RU2018136648

(51) Int. Cl.
*H02G 3/04*    (2006.01)
(52) U.S. Cl.
CPC ......... *H02G 3/0406* (2013.01); *H02G 3/0481* (2013.01)
(58) Field of Classification Search
CPC ...... H02G 3/0406; H02G 3/0481; H02G 9/06; F16L 9/125; F17D 5/06
(Continued)

(56) References Cited
U.S. PATENT DOCUMENTS 3,613,231 A * 10/1971 Pugh .................... H01B 7/29
                                                                174/15.6
4,571,450 A *  2/1986 Duffy .................... H01B 7/282
                                                                174/106 SC
(Continued)

*Primary Examiner* — Timothy J Thompson
*Assistant Examiner* — Michael F McAllister
(74) *Attorney, Agent, or Firm* — Birch, Stewart, Kolasch & Birch, LLP

(57) ABSTRACT

A cable line includes a conduit having a tubular body, the wall of which is made of polymeric material, and an electrical cable provided with an outer sheath made of polymeric material and laid inside the conduit's body along its entire length. Herewith, the body wall is made with the provision of its electrically conductive properties, causing the possibility of current flow through the wall in the direction from its inner surface to the outer surface, furthermore the ratio of the diameter of the inner surface of the body wall to the diameter of the outer sheath of the cable is not less than 1.5.

8 Claims, 2 Drawing Sheets

(58) Field of Classification Search
USPC .......................................................... 174/68.1
See application file for complete search history.

(56) References Cited

U.S. PATENT DOCUMENTS

| | | | |
|---|---|---|---|
| 6,046,408 A * | 4/2000 | Forrest .................. | H01B 9/028 174/106 SC |
| 2013/0168126 A1 * | 7/2013 | Kuchta .................. | H01B 7/361 174/102 SC |

* cited by examiner

CABLE LINE WITH ELECTRICALLY CONDUCTIVE AREAS

TECHNICAL FIELD

The invention relates to wiring products, in particular to high-voltage power transmission lines, mainly used for underground cable routes.

PRIOR ART

Known cable line designs that include a cable and means to ensure that the cable is placed along the cable route.

It is known cable line [RU2617451], containing cable laid in a cable tray, as well as cable shelves located under the cable tray transverse to the longitudinal direction of its sides, with the sides of the cable tray are inclined in different directions from each other, which contributes to increasing the stability of the cable line to vertical load, and as a result, increasing the durability of the cable.

This cable line provides cable placement and maintaining its position inside buildings or on buildings, structures.

However, it is not designed for underground cable routes, which limits the scope of its use. In additional, the means of cable placement used in this design do not ensure its protection from external influences.

Nowadays, cable lines are widely used, which as a means for cable placement contain a conduit having a tubular body, in the inner space of which the cable is laid. The tubular body of the conduit can be made as a single tube or as several tubes docked together. Thus, there is a known cable line described in [the mag. News of Electrotechnics N 4 (82) 2013, pp. 78-83], which has been chosen as the closest prior art.

The cable line under consideration includes a conduit having a tubular body containing a polyethylene wall, as well as a power cable (6-500 kV) provided with an external polymeric sheath, laid in the inner space of the tubular body along its length. The use of polymeric tubular conduit having sufficient mechanical strength and stability to external environment factors, provides cable protection from mechanical damage and external influences, which increases the reliability of this cable line, and also makes it possible to use it for laying both aboveground and underground cable routes.

With that, it is possible to use cost-effective and technologically methods of cable laying, in particular, the method of horizontal-directional drilling, in which the polymeric tubular body of the cable conduit is pulled into the ground, and then the cable is pulled into it.

However, the cable line in question does not provide the possibility of searching for the place of power cable outer sheath damage by methods known from the prior art, based on the search and localization with the help of instruments used for this purpose the place on the cable line route where the test current from the conductive screen of the power cable through the damaged outer sheath goes into the ground.

The output of current into the ground is prevented by the wall of the casing, made of polyethylene, which is a dielectric, not possessing the properties of electrical conductivity in the direction from its inner surface to the outer surface.

DISCLOSURE OF THE INVENTION

The claimed invention is based on the problem of providing a possibility to carry out tests and search for the place of damage of the outer sheath of an electric cable placed in a protective tubular polymeric conduit, by methods based on detecting the place of current's output into the ground.

The problem posed is solved by the fact that the cable line includes a conduit having a tubular body, the wall of which is made of polymeric material, and also an electrical cable provided with an outer sheath made of polymeric material and laid inside the conduit's body along its entire length. With that, according to the invention, the wall of the body is made with the provision of its electrically conductive properties, conditioning the possibility of current flow through the wall in the direction from its inner surface to the outer surface, with the ratio of the diameter of the inner surface of the body wall to the diameter of the outer cable sheath being at least 1.5.

In a particular case of the implementation of the invention, the electrically conductive properties of the wall are provided by using a polymeric electrically conductive material for its manufacture.

In a particular case of the implementation of the invention, the electrically conductive properties of the wall are provided by using a polymeric dielectric material for its manufacture and the formation of electrically conductive sections in it, made in the form of through holes in the body wall, distributed along its length, in each of which an electrically conductive element extending to the entire depth of the through hole is installed.

Due to the fact that in the claimed cable line the electric cable is laid inside the tubular conduit, the placement and preservation of the cable position in the place of the cable route, as well as protection of the cable from mechanical damage and external influences during its operation is provided. With that, due to the use of polymeric material for the manufacture of the body wall of the conduit, which is resistant to corrosion and mechanical influences, flexibility, lightness, durability, increases the ease of operation and reliability of the claimed cable line.

In addition, the presence in the claimed cable line of tubular polymeric conduit makes it possible to use it in both aboveground and underground cable routes using cost-effective and technologically advanced methods of laying, in particular, the method of horizontal-directional drilling.

When testing the cable line to detect damage to the cable outer sheath, it is necessary to ensure exit of the test current from the cable through the place of sheath damage into the surrounding ground.

Due to the placement of the cable in the tubular conduit, the wall of which case is made with the provision of its conductive properties, causing the possibility of current flow through the wall in the direction from its inner surface to the outer surface, in the claimed cable line is organized the way for the current formed in the internal space of the body when the external cable sheath is damaged, through the wall of the body beyond its borders.

In practice, the exit of the current from the body of the cable conduit into the surrounding ground is difficult because of its low electrical conductivity, due to the prolonged exposure of the ground to the high operating temperature of the cable. Thus, the core temperature of high-voltage cable in normal mode of operation reaches 90° C., and the temperature of its outer sheath reaches 80° C. Heating of the ground leads to the absence or minimization of moisture content, which fills the gaps between the ground particles and has the properties of electrical conductivity, which leads to a decrease in the electrical conductivity of the ground.

Placing the cable in an electrically conducting polymeric tubular body contributes to a decrease in the temperature of heating of the surrounding ground and, accordingly, to a negative effect of heating on the electrical conductivity of the ground, the greater the size of the gap between the cable and the tubular body, which is determined by the ratio of the diameters of the body and the cable.

As practice shows, for a tangible reduction in the heating of the ground surrounding the cable line, the ratio of the diameter of the inner surface of the body wall to the diameter of the outer cable sheath should be at least 1.5.

In addition, the larger the diameter of the conductive tubular body, the greater the contact area of the conduit with the surrounding ground, which contributes to the reduction of electrical resistance on the path from the body to the ground.

The above factors contribute to the reduction of resistance to current on its way from the body to the ground.

Thus, in the claimed cable line is organized the path of current from the internal space of the body, where it gets from the surface of the cable from the damaged outer sheath, through the wall of the body beyond its borders into the surrounding ground, where the current can be fixed by the devices, which search the place of cable damage.

To make it possible to find and locate places of cable sheath damage, it is necessary to make the polymeric body wall conductive in the direction from its inner surface to its outer surface for all its thickness, i.e. in transverse (radial) direction. With that, it is not necessary for the body wall to be electrically conductive in the longitudinal direction.

The polymeric body wall may be made to have conductive properties in the transverse direction, in particular by using conductive polymers for its manufacture. In such a case, the body wall is electrically conductive in a transverse direction along the entire length of the body.

The polymeric body wall may be made with providing electrically conductive properties in a transverse direction in certain portions thereof, in particular by creating in the volume of the body wall certain electrically conductive areas distributed along the length of the body.

The said electrically conductive areas may be distributed along the length of the body with some spacing depending on the required accuracy of cable damage location. With that, said areas may be arranged along the length of the body in a single row or may be additionally distributed along the circumference of the cross section of the body and in this case may form several rows along the length of the body.

In order to combine individual areas with electrically conductive properties in the transverse direction into a single system in order to facilitate current exit from the internal space of the body beyond its borders, the body wall may have a coating of electrically conductive material on its inner or outer surface or on both surfaces (multi-layer wall).

The conduit body can be made as a single tube or as several tubes connected to each other.

A power cable (0.4-500 kV) containing a core, an inner insulating sheath, a metal screen and an outer sheath can be used as an electric cable.

The cable is installed inside the tubular body, preferably with the presence of areas of contact (mechanical and/or electrical) of its outer sheath with the inner surface of the body.

The internal volume of the tubular body may be filled with an electrically conductive medium, such as water, which ensures a guaranteed current flow from the cable surface to the internal surface of the body even in the areas where there is no contact of the cable outer sheath with the internal surface of the body.

Thus, the technical result of the invention is the possibility to test and detect the place of damage of the outer sheath of the electric cable, placed in the protective tubular polymeric conduit, by methods based on the detection of the place of current exit into the ground.

When the electrically conductive properties of the wall are provided by using an electrically conductive polymeric material for its manufacture, the cable line is easily constructed to achieve the electrically conductive properties of the body wall in a transverse direction throughout its entire thickness. With that, the body wall also has electrically conductive properties throughout its thickness in the longitudinal direction.

Electrically conducting polymeric materials can be composite polymeric materials based on different polymers (thermo, reacto, elasto-layers) containing electrically conducting fillers (carbon black, graphite, carbon, metal and metallic fibers, metal powder, etc.) or polymeric materials in which the molecules themselves or certain specifically arranged supramolecular formations possess electrical conductivity.

In the case where the electrically conductive properties of the wall are provided by using a polymeric dielectric material for its manufacture and forming in it the electrically conductive areas described above, the electrically conductive properties of the body wall in the transverse direction for its entire thickness in discrete areas distributed along the length of the body are achieved. With that, dielectric polymeric materials are used for manufacturing the conduit, the cost of which is lower than the cost of electrically conductive polymers.

As electrically conductive elements, by means of which a path for current from the internal space of the body through its wall is formed, elements of various kinds and shapes made of electrically conductive materials, in particular of metals or electrically conductive plastics, can be used. Thus, in particular, bolts, self-tapping screws, rivets, crosspieces, rod, wire, ribbon elements and the like may be used as such elements.

Wire and ribbon elements can be made in the form of a loop or ring (including an open loop) covering the cable from the bottom and from the sides, and each of these elements has an end section installed in the through hole and extending to its full depth.

It is advantageous to have the places of installation of the conductive elements in the through holes of the wall hermetically sealed.

The number of electrically conductive elements distributed along the body along its length and their step depends on the required accuracy of cable damage location search and is chosen the more the more the length of the conduit body. With that, when forming the body from docked tubular sections, in one section of the conduit, which has a relatively small length, can be installed one electroconductive element.

Electrically conductive elements along the length of the body may be located with an indentation from the end sections of the connected tubular sections for their free welding.

When the outer sheath of the cable is made of a polymeric electrically conductive material, it is easier for the current to escape from the damaged cable sheath to the inner surface of the body wall.

BRIEF DESCRIPTION OF THE DRAWINGS

The proposed invention is explained by the accompanying drawings.

BEST EMBODIMENT OF THE INVENTION

Figure 1:
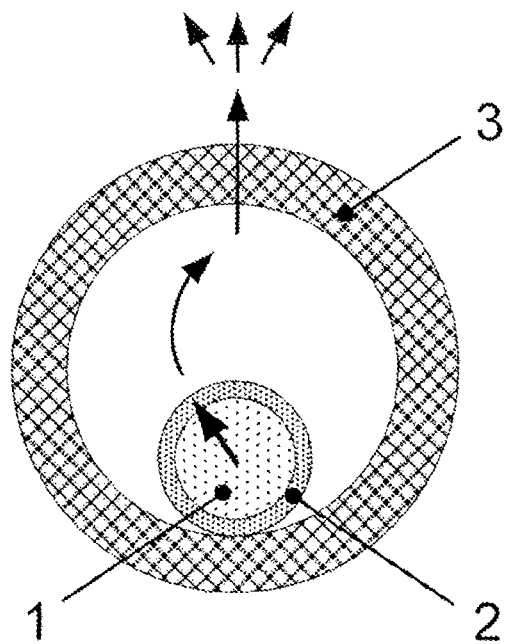
FIG. 1 shows a general view of a cable line, in which the wall of the conduit body is made of a polymeric conductive material (cross-section)

A cable line contains the conduit having the tubular body, the wall 3 of which is made of polymeric material, and the electrical cable 1 provided with an outer sheath 2 made of polymeric material and laid inside the conduit's body along its entire length.

In general, the conduit may also contain connection couplings, end caps and other (not shown in the drawing).

The ratio of the diameter D1 of the inner surface of the wall 3 to the diameter D2 of the outer sheath 2 of the cable 1 is a value of at least 1.5.

The wall 3 of the body is made with the provision of its electrically conductive properties, resulting in the possibility of current flow through the wall 3 in the direction from its inner surface to the outer surface.

Figure 2:
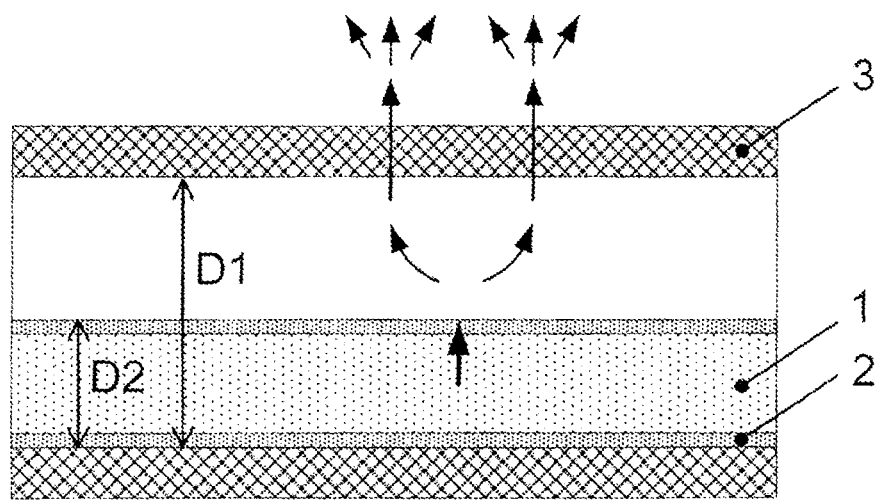
FIG. 2—the same (longitudinal section)

With that, (see FIG. 2), the ratio of the diameter D1 of the inner surface of the body wall 3 to the diameter D2 of the outer sheath of the cable 1 is at least 1.5.

Thus, FIG. 1, 2 shows a cable line in which the wall 3 is made of a polymeric electrically conductive material, which achieves its electrically conductive properties, including in the direction from the inner surface of the wall 3 to its outer surface (in the transverse direction). With that, the outer sheath 2 of the cable 1 is made of dielectric polymeric material.

In FIG. 1, 2 the arrows indicate the path of current from the cable 1 through the damaged outer sheath 2 into the inner space of the body and beyond (into the ground).

Figure 3:
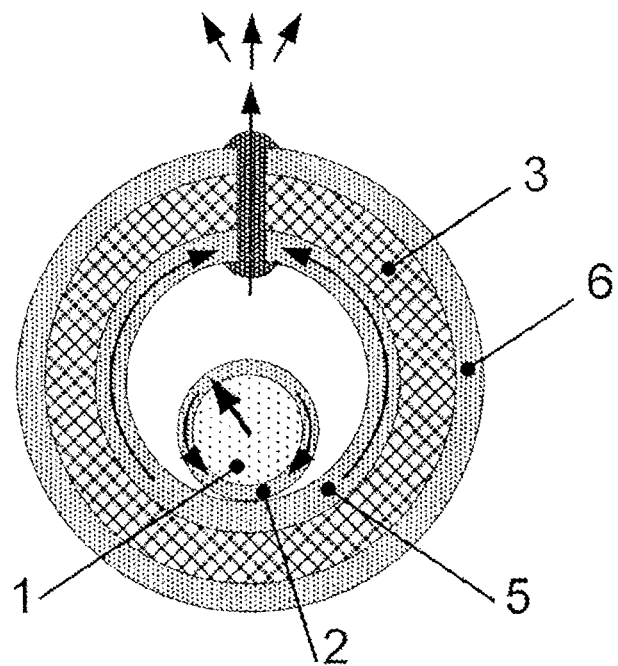
FIG. 3 shows a general view of a cable line, in which conductive areas are formed in the conduit body wall (cross-section)

Thus, FIG. 3, 4 shows a cable line in which the wall 3 is made of a polymeric dielectric material and in it electrically conductive areas are formed in the form of through holes in the wall 3 of the body (not marked in the drawing with a position), distributed along its length, in each of which an electrically conducting element 4 is installed passing through the entire depth of the through hole (in the drawing a position is marked with one electrically conductive element). In particular, each electrically conductive element 4 is in the form of a metal jumper.

Figure 4:
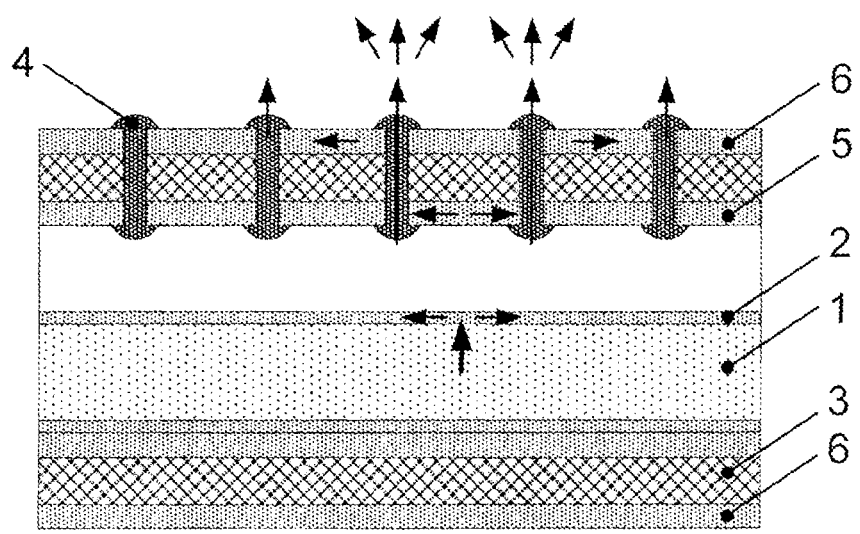
FIG. 4—the same (longitudinal section).

In addition, in the cable line (FIGS. 3, 4), the outer sheath 2 is made of an electrically conductive polymeric material, and the wall 3 has an inner 5 and an outer 6 coating made of an electrically conductive material, in particular metal.

In FIG. 3, 4 arrows indicate the path of current from the cable 1 through the damaged outer sheath 2 on its electrically conducting surface and further on the electrically conducting inner layer 5 of the wall 3, through the jumper 4 outside the body (in the ground).

The device works in the following way.

When the test current is applied along the screen of the cable 1, the current from the damaged sheath 2 of the cable 1 either enters the inner space of the wall 3 of the conduit body (FIG. 1, 2) and then through the air medium that is in the inner space of the body, enters the inner surface of the wall 3 or (FIG. 3, 4) the current from the damaged sheath of the cable 1 directly enters the inner surface (layer 5) of the wall 3 of the body, in particular (FIG. 3, 4) through the electrically conductive sheath 2 of the cable 1.

The very fact of the test current flowing by the test apparatus connected to the cable means that the cable sheath is indeed damaged somewhere, and the current is somewhere escaping into the ground. The location of the test current exiting the cable into the ground, recorded by the instruments, will indicate the specific fault location on the cable route.

To increase the conductive properties of the air inside the conduit body, its internal space can be filled with an electrically conductive medium such as water.

Current (FIGS. 1, 2) from the inner surface of the wall 3 passes through it in the direction from the inner surface to the outer surface that provides the conductive properties of the wall 3 in the transverse direction, and then enters the ground, or current (FIGS. 3, 4) passes through the bridges 4, located near the fault 2 outer sheath cable 1, in the direction from the inner surface of the wall 3 (layer 5) to its outer surface (layer 6) and then enters the ground.

The current, penetrating into the ground, is recorded by the devices, which are used to search for the cable 1 damage.

INDUSTRIAL APPLICABILITY

The invention can be used in industries where cable lines are used, such as, electric power industry, housing and communal services, oil and gas, chemical industry and other industries.

Tests of the claimed cable line by a number of independent organizations in laboratory and field conditions, which demonstrated the ability to quickly and accurately find places of damage to the cable sheath.

So, in particular, the organization Public Joint Stock Company "Federal Testing Center" tested the cable line laid in the ground at the depth of 1 m, in which the cable, containing the area with a damaged sheath, was placed in the tubular body made of special polymeric conducting material (Manufacturer LLC "EnergoTek", marking "PROTECTOR FLEX OMP").

The search for the damaged location of the cable sheath was carried out using the standard "step voltage" method.

It was found the place of cable sheath damage with an error of 0.3 m.

The specified result testifies to the high accuracy of finding the place of cable damage with the use of the claimed invention.

What is claimed is:

1. A cable line, including a conduit having a tubular body, the wall of which is made of polymeric material, and an electrical cable provided with an outer sheath made of polymeric material and laid inside the conduit's body along its entire length, wherein the body wall is made with the provision of its electrically conductive properties, causing the possibility of current flow through the wall in the direction from its inner surface to the outer surface, furthermore the ratio of the diameter of the inner surface of the body wall to the diameter of the outer sheath of the cable is not less than 1.5.

2. The cable line according to claim 1, wherein the electrically conductive properties of the wall are provided by using a polymeric electrically conductive material for its manufacture.

3. The cable line according to claim 1, wherein the electrically conductive properties of the wall are provided by using a polymeric dielectric material for its manufacture and the formation of electrically conductive sections in it, made in the form of through holes in the body wall, distributed along its length, in each of which an electrically conductive element extending to the entire depth of the through hole is installed.

4. The cable line according to claim 1, wherein the outer sheath of the cable is made of a polymeric electrically conductive material.

5. The cable line according to claim 1, wherein the electrically conductive areas of the tubular body includes one of bolts, self-tapping screws, rivets, crosspieces, rods, wires and ribbon elements.

6. The cable line according to claim 5, wherein the wires or the ribbon elements are in the form of a loop or ring.

7. The cable line according to claim 1, wherein an internal volume of the tubular body is filled with an electrically conductive medium.

8. The cable line according to claim 1, wherein the conduit includes:
   an inner layer;
   the wall surrounding the inner layer; and
   the sheath as an outer layer, the outer layer surrounding the wall.

\* \* \* \* \*